(12) United States Patent
Stanzel et al.

(10) Patent No.: US 7,429,712 B2
(45) Date of Patent: Sep. 30, 2008

(54) GAS SYSTEM FOR WELDING-TYPE DEVICES

(75) Inventors: Kenneth A. Stanzel, Appleton, WI (US); John Breitbach, Greenville, WI (US); Ronald Woodward, Kaukauna, WI (US); Bruce Albrecht, Grayslake, IL (US); John H. Pilarski, Milwaukee, WI (US)

(73) Assignee: Illinois Tool Works Inc., Glenview, IL (US)

( * ) Notice: Subject to any disclaimer, the term of this patent is extended or adjusted under 35 U.S.C. 154(b) by 286 days.

(21) Appl. No.: 10/906,317

(22) Filed: Feb. 14, 2005

(65) Prior Publication Data

US 2005/0252890 A1 Nov. 17, 2005

Related U.S. Application Data

(63) Continuation-in-part of application No. 10/709,540, filed on May 12, 2004.

(51) Int. Cl.
*B23K 9/16* (2006.01)
(52) U.S. Cl. .................................. 219/74; 219/130.1
(58) Field of Classification Search ............ 219/136, 219/74, 130.1
See application file for complete search history.

(56) References Cited

U.S. PATENT DOCUMENTS

| | | | |
|---|---|---|---|
| 4,702,277 A | 10/1987 | Ollivier | |
| 5,472,024 A | 12/1995 | Brugerolle et al. | |
| 5,507,531 A | 4/1996 | Aldridge | |
| 5,791,328 A | 8/1998 | Alexander | |
| 5,904,133 A | 5/1999 | Alexander et al. | |
| 5,950,611 A | 9/1999 | Lopez et al. | |
| 6,213,111 B1 | 4/2001 | Alexander et al. | |
| 6,227,187 B1 | 5/2001 | Alexander et al. | |
| 6,343,599 B1 | 2/2002 | Perrone | |
| 6,405,722 B2 | 6/2002 | Colby | |
| 6,474,325 B2 | 11/2002 | Rice | |
| 6,543,475 B2 | 4/2003 | Colby | |
| 6,590,184 B1 * | 7/2003 | Andersen | 219/136 |
| 6,644,295 B2 | 11/2003 | Jones | |
| 6,675,791 B1 | 1/2004 | Alexander et al. | |
| 6,977,358 B2 * | 12/2005 | Albrecht et al. | 219/130.1 |
| 6,992,266 B1 * | 1/2006 | Di Novo et al. | 219/137.9 |

FOREIGN PATENT DOCUMENTS

| | | |
|---|---|---|
| DE | 83 08 999.3 U | 11/1983 |
| DE | 83 08 999.3 U | 11/1983 |
| JP | 60-64769 * | 4/1985 |
| JP | 60-64769 A | 4/1985 |
| JP | S60-64769 | 4/1985 |

* cited by examiner

*Primary Examiner*—Kevin P Kerns
(74) *Attorney, Agent, or Firm*—Ziolkowski Patent Solutions Group, SC

(57) ABSTRACT

A welding-type device and gas system for use therewith are disclosed. The gas system of the welding-type device includes a canister that is constructed to contain a shielding gas therein and is connectable to the welding-type device. The canister is sized to be mounted to the welding-type device when it is attached thereto such that the welding-type device can be efficiently and conveniently transported from one location to another with the source of shielding gas securely affixed thereto.

18 Claims, 7 Drawing Sheets

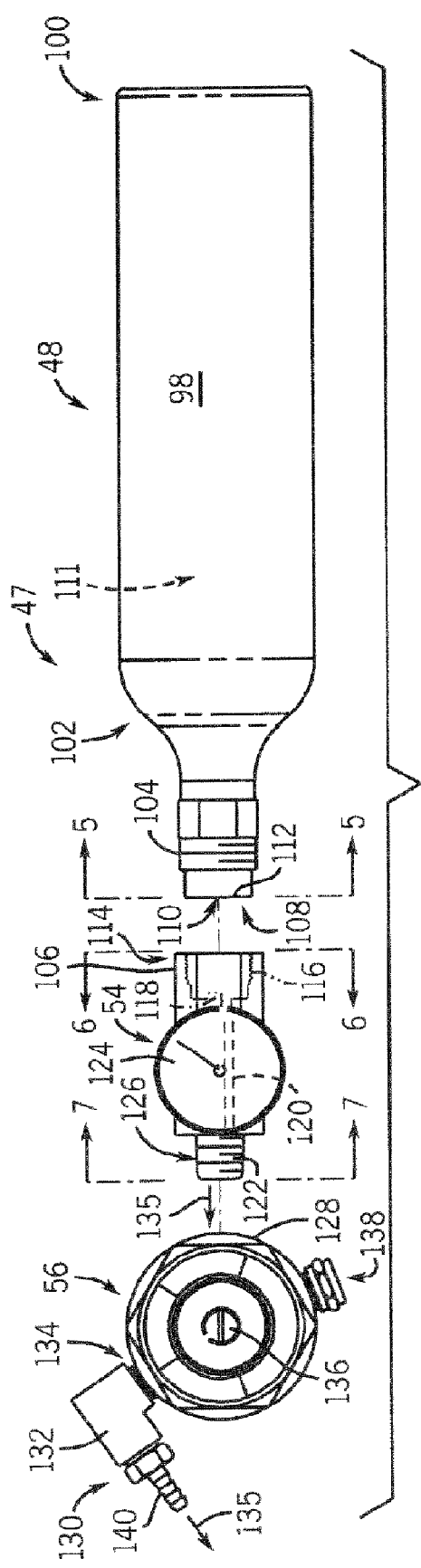
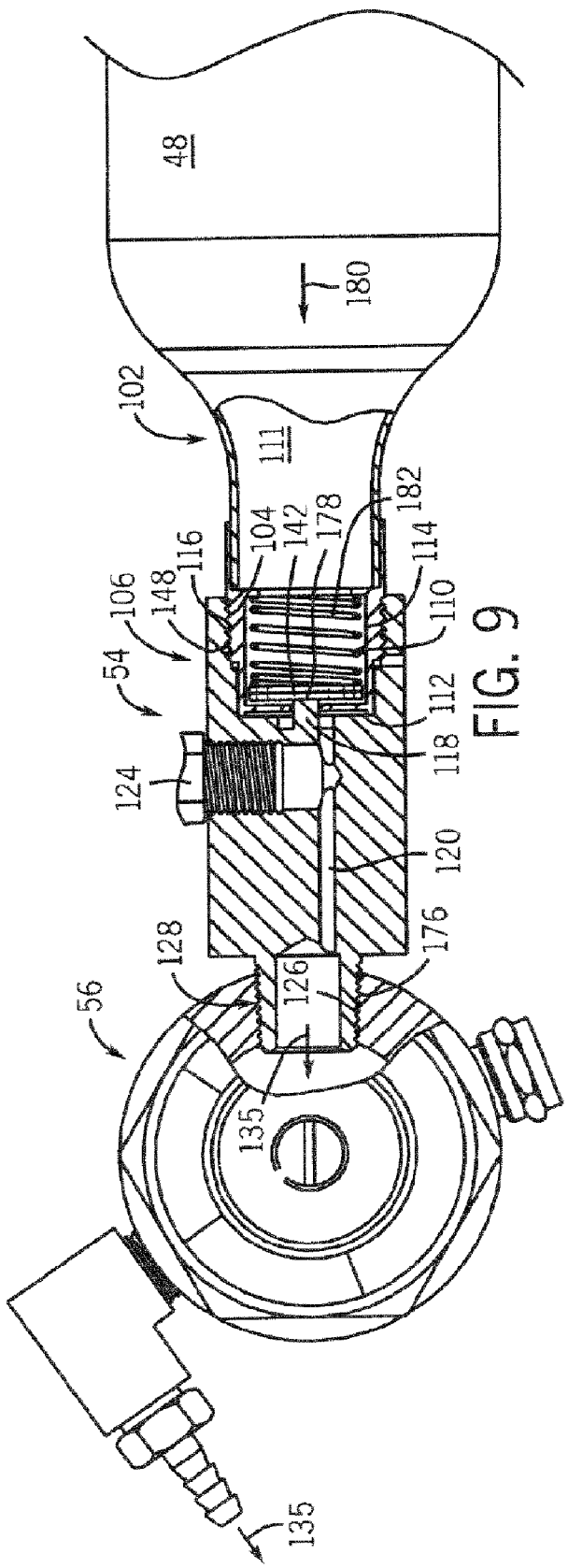

GAS SYSTEM FOR WELDING-TYPE DEVICES

CROSS-REFERENCE TO RELATED APPLICATIONS

The present application is a Continuation in Part of U.S. patent application Ser. No. 10/709,540 filed on May 12, 2004.

BACKGROUND OF THE INVENTION

The present invention relates generally to welding systems and, more particularly, to a gas system for providing shielding gas to a weld.

Welder power sources have become increasingly portable in recent years. This portability is largely the result of lighter unit weight and improved electrical components. One advancement in the area of electrical components has been the incorporation of inverter-type power sources. The application of an inverter power source has reduced the size and weight of welders and created usable space within the confines of the housing, while maintaining the ability to generate the outputs required for welding.

Improvements in wire feeder technology have also improved the ease of use and portability of a welder. Wire welding is generally believed to be easier to learn than conventional stick welding and as such, relatively inexperienced artisans can produce adequate results in relatively little time. As a result, due to the ease of use and versatility of application, many users prefer wire welding over conventional stick welding.

Space in any work environment is always at a premium. Whether the welder is used in the hobbyist's garage or the machine shop of an industrial plant, the size of the unit is always a design consideration. The space used by a welder is not limited to the dimensions of the power source itself but includes the ancillaries related to welding processes such as cables, consumables, and gas cylinders. The space required for the storage and maintenance of these items is another consideration associated with many welders.

Shielding gas containers, commonly referred to as gas cylinders, provide gas to the welding process. This gas essentially encapsulates the welding process in order to protect the integrity of the weld from contaminants and also enhances arc performance during a welding process. The shielding gas is generally provided in very large and very heavy cylinders. The cylinders are constructed ruggedly to withstand the high pressure of the gas contained therein and the rigors of the workplace. A regulator and valve assembly are typically attached to the gas cylinder and allow the operator of the welding power source to control the amount of gas supplied to the welding process.

The size and weight of the gas cylinders significantly detracts from the portability of the welder. Additionally, attempts to move the welder and gas cylinder together presents an opportunity for inadvertent damage to the gas cylinder or to the regulator attached thereto unless a cart is provided. Such carts however are large and typically constructed to accommodate bulky gas cylinders. As such, the portability of the welding apparatus is limited by the portability of the shielding gas cylinder.

It would therefore be desirable to design a welding-type device having a shielding gas system that is lightweight and highly portable.

BRIEF DESCRIPTION OF THE INVENTION

The present invention is directed to a shielding gas system that solves the aforementioned drawbacks.

Therefore, in accordance with one aspect of the present invention, a welding-type device having a pressure vessel is disclosed. The welding-type device includes a power source configured to generate a welding-type power and a housing positioned thereabout. The pressure vessel is attached at least partially to an exterior of the housing and is supported thereby. The pressure vessel is constructed to provide shielding gas to a weld and sized for direct mounting to the housing.

According to another aspect of the present invention, a gas system for a welding-type apparatus is disclosed. The gas system includes a canister constructed to receive a gas therein. An enclosure is constructed to receive at least a portion of the canister therein. The gas system includes a retainer to removably secure the enclosure to a housing of a welding-type apparatus when the enclosure is attached thereto.

In accordance with a further aspect of the present invention, an apparatus having a power source configured to generate a power signal suitable for welding-type applications is disclosed. A housing is positioned about at least a portion of the power source. A regulator is supported by at least one of the housing and the power source and is connectable to a gas container that is at least partially external to the housing.

Therefore, the present invention provides a welding-type device having a shielding gas system that is lightweight and easily transportable. Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 4 is an exploded plan view of the shielding gas system of FIG. 2.

FIG. 9 is a side plan view of the shielding gas system of FIG. 2 in partial section.

DETAILED DESCRIPTION OF THE PREFERRED EMBODIMENT

As one skilled in the art will fully appreciate, the hereinafter description of welding devices not only includes welders but also includes any system that requires high power outputs that can benefit from the use of a compressed shielding gas. Such systems can include heating and cutting systems. Description of a welding-type apparatus or device illustrates just one embodiment in which the present invention may be implemented.

Figure 1:
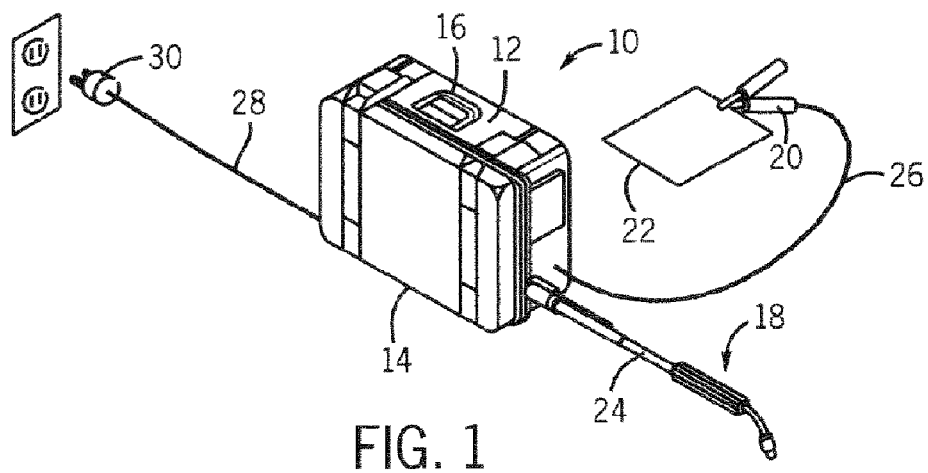
FIG. 1 is a perspective view of an exemplary power source incorporating one embodiment of the present invention.

Referring to FIG. 1, a perspective view of a welding device incorporating the present invention is shown. Welding device 10 includes a housing 12 enclosing the internal components of the welding device under a cover 14. The welding device 10 includes a handle 16 for transporting the welding system from one location to another. Although shown as a "suitcase" welding device, capable of being easily transported by one person, the present invention is equally applicable to larger welding devices which may have more limited portability. To effectuate the welding process, such as TIG or MIG welding, the welding device includes a torch 18 as well as a work clamp 20. The work clamp 20 is configured to complete an electrical circuit from torch 18 through workpiece 22. As is known, when the torch 18 is in relative proximity to workpiece 22, a welding arc or cutting arc results, depending upon the particular welding desired. A pair of cables 24 and 26 connects the torch 18 and work clamp 20 to the housing 12, respectively. A power cable 28 extends from welding device 10 and is connectable to a variety of inputs. As shown, power cable 28 includes a plug 30 constructed to engage an electrical outlet and supply power to welding device 10 from a power grid. It is understood power cable 28 can be configured to communicate power to welding device 10 from any type of power source, including an inverter based power source, an engine driven generator, a power grid, a battery, etc.

Figure 2:
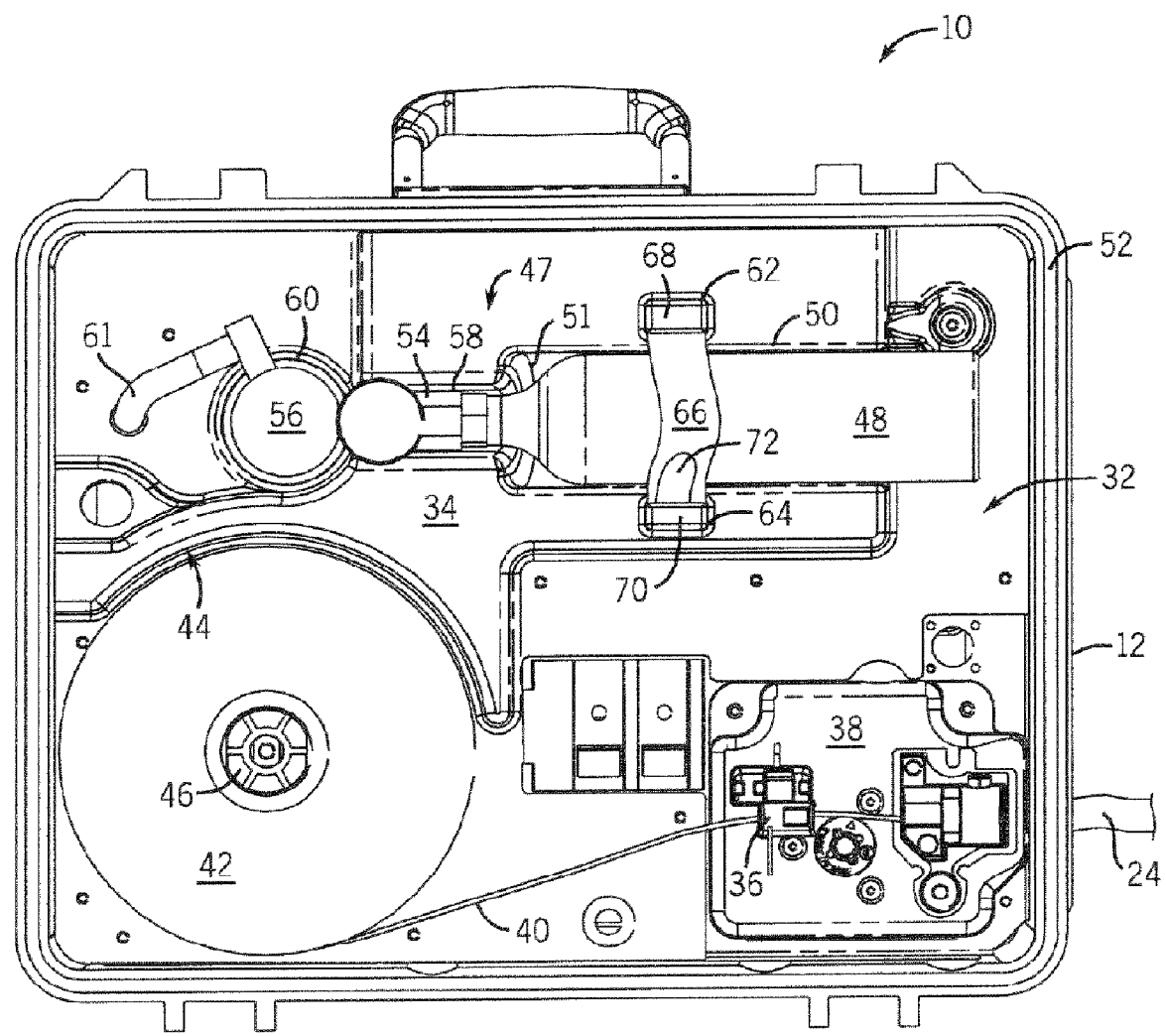
FIG. 2 is a side elevational view of the power source of FIG. 1 with a cover removed.

FIG. 2 shows welding device 10 with cover 14 removed therefrom. Having cover 14 removed exposes an internal cavity 32 of welding device 10. A shroud 34 separates a majority of internal cavity 32 so that removing cover 14 does not expose a majority of the electronic components of the welding device. A wire guide 36 and a wire feed 38 are positioned proximate the connection of cable 24 in housing 12. A guide wire 40 is drawn from a spool 42 by wire feed 38 to the torch through cable 24. Shroud 34 has a curved portion 44 to accommodate the positioning of spool 42 on a hub 46 of welding device 10. A shielding gas system 47 includes a gas cylinder 48 constructed to snuggly engage a first portion 50 of a recess 51 formed in shroud 34. Although gas cylinder 48 is shown in a generally horizontal orientation relative to welding device 10, such an orientation is merely exemplary. It is understood that gas cylinder 48 could be positioned in any orientation and could be located entirely within a perimeter 52 of housing 12 as shown, partially within housing 12, or external to the housing, if desired.

Shielding gas system 47 includes an adapter 54 and a regulator 56. Adapter 54 is fluidly connected between gas cylinder 48 and regulator 56 of shielding gas system 47. Adapter 54 engages gas cylinder 48 and allows shielding gas to flow from gas cylinder 48 to regulator 56 immediately upon connection thereto, as will later be described in more detail with reference to FIGS. 4-7 and 9. Adapter 54 is constructed to be snuggly positioned in a second portion 58 of recess 51. Regulator 56 is positioned in a third portion 60 of recess 51 and is fluidly connected to the torch of welding device 10 via a hose 61 and controls the amount of shielding gas provided to the torch during a welding operation. Optionally, during operation of a welding process, a valve (not shown) is fluidly connected between torch 18 and regulator 56 such that the flow of shielding gas from shielding gas system 47 to torch 18 is only allowed when an operator has depressed a trigger or other actuator of torch 18.

Shroud 34 has a first boss 62 and a second boss 64 which generally flank gas cylinder 48. A strap 66 has a first end 68 pivotally connected to first boss 62 and a second end 70 constructed to engage second boss 64 of shroud 34. A latch 72 is pivotally connected to second end 70 of strap 66 and is constructed to removably engage second boss 64 of shroud 64. Strap 66 spans gas cylinder 48 and secures the gas cylinder in recess 51. Latch 72 allows an operator to quickly remove and replace gas cylinder 48 from welding device 10.

Figure 3:
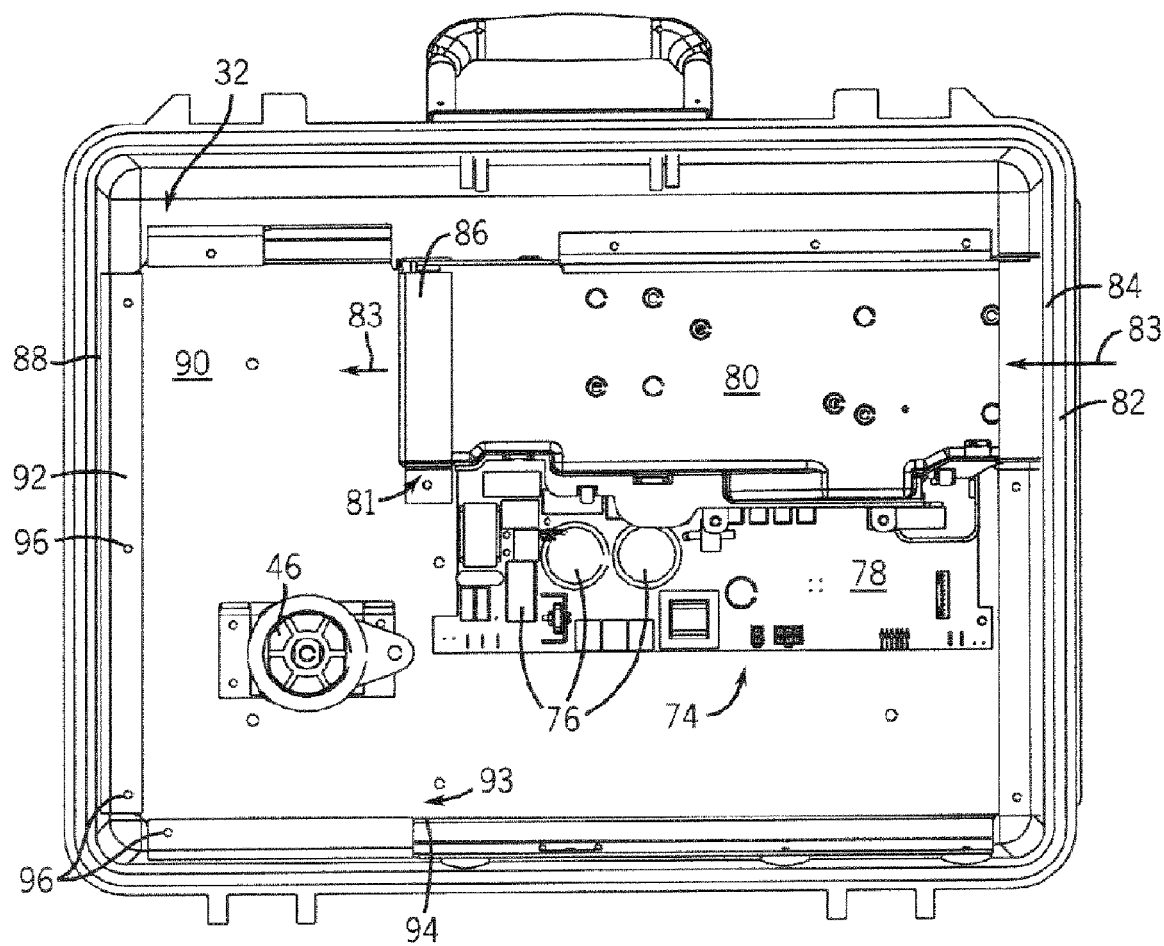
FIG. 3 is a side elevational view of the power source of FIG. 2 with a shroud and a shielding gas system removed.

Referring to FIG. 3, removing shroud 34 from internal cavity 32 of welding device 10 exposes a power supply 74 of welding device 10. Power supply 74 includes a plurality of electrical components 76 attached to a circuit board 78. Preferably, power supply 74 is an inverter based power supply. A wind tunnel 80 is attached about a portion 81 of circuit board 78. Wind tunnel 80 has a plurality of heat generating components (not shown) positioned thereabout. These heat generating components can include transformers, inductors, and core windings necessary to generate a power signal suitable for welding applications. Those components mounted within wind tunnel 80 are cooled by direct exposure to a flow of cooling air, indicated by arrow 83, through housing 12 of welding device 10. A fan (not shown) can also be located in the wind tunnel to facilitate moving sufficient amounts of cooling air through the welding device 10. A screen 82 is located over an inlet opening 84 formed in housing 12 and prevents particulates associated with a work environment from entering the housing of welding device 10. In addition to the heat generating components positioned within wind tunnel 80, or alternatively thereto, wind tunnel 80 is also constructed to accommodate heat sinks (not shown) therein. The heat sinks are thermally connectable to the electrical components 76 that are preferably positioned outside of wind tunnel 80. Such a construction maximizes cooling of all of the heat generating electrical components of power supply 74 while reducing the exposure of electrical components 76 to any particulates that may be carried on the cooling flow 83 through housing 12 of welding device 10.

Prior to entering wind tunnel 80, cooling flow 83 passes through internal cavity 32 of welding device 10 and cools electrical components 76 of welding device 10. Air that enters welding device 10 passes through wind tunnel 80, exits wind tunnel 80 at an outlet end 86, and exits the welding device through an exhaust vent 88 formed in housing 12. A mounting bracket 90 is positioned in internal cavity 32 and secures wind tunnel 80 and power supply 74 to housing 12. Hub 46 extends from mounting bracket 90 and is constructed to receive wire spool 42 shown in FIG. 2. Returning to FIG. 3, a flange 92 extends about a portion 93 of perimeter 94 of mounting bracket 90 and has a plurality of holes 96 formed therein. Holes 96 are positioned to receive corresponding bosses (not shown) that extend from shroud 34 and secure shroud 34, as shown in FIG. 2, to welding device 10. Alternatively, it is understood that shroud 34 could be attached to flange 92 with a plurality of threaded fasteners.

Referring to FIG. 4, the main components of shielding gas system 47 are shown separated from one another. Gas cylinder 48 has a body 98 which extends between a base portion 100 and a neck portion 102. Neck portion 102 has a threaded section 104 constructed to engage a first end 106 of adapter 54. Neck portion 102 of gas cylinder 48 has an opening 108 formed through neck portion 102. A valve 110 is positioned in opening 108 and operatively separates an internal cavity 111 of gas cylinder 48 from atmosphere. Valve 110 is biased to a closed position when gas cylinder 48 is separated from adapter 54 and prevents communication between internal cavity 111 of gas cylinder 48 and atmosphere. Valve 110 does not extend beyond an end face 112 of gas cylinder 48. Such a construction prevents the inadvertent venting of internal cavity 111 when gas cylinder 48 is not connected to adapter 54. Valve 110 is constructed integrally with gas cylinder body 98 and neck portion 102 to form a one-piece valve and gas cylinder 48.

Adapter 54 has a recess 114 (shown in phantom) formed in first end 106. A periphery 116 of recess 114 is threaded to engage threaded section 104 of gas cylinder 48. A nipple 118 extends into recess 114 of first end 106 of adapter 54 and is constructed to engage valve 110 of gas cylinder 48 upon connection of the gas cylinder to adapter 54. Such a construction allows the automatic actuation of valve 110 upon the connection of gas cylinder 48 to adapter 54 and results in the immediate communication of gas between internal cavity 111 and regulator 56. That is, by biasing valve 110 to an open position, nipple 118 allows passage of gas from internal cavity 111 of gas cylinder 48 into a passage 120 formed in adapter 54. In this manner, a manually operated valve is eliminated. Passage 120 fluidly connects first end 106 of adapter 54 with a second end 122 of adapter 54. A pressure gauge 124 is in fluid communication with passage 120 and indicates the pressure of shielding gas contained therein. Second end 122 of adapter 54 has a threaded portion 126 constructed to engage regulator 56. Although threaded portion 126 of second end 122 is shown in a male configuration and the threading of periphery 116 of recess 114 is shown in a generally female configuration, it is understood that these connections are merely exemplary and could vary depending on the connection configuration of the components being connected thereto.

Regulator 56 has an opening 128 formed therein and constructed to engage threaded portion 126 of second end 122 of adapter 54. An outlet 130 having an elbow portion 132 is connected to a second opening 134 formed in regulator 56. A gas passage, indicated by arrows 135, extends between opening 128 and outlet 130 and is interrupted by an adjusting screw 136. Manipulation of adjusting screw 136 regulates the flow of shielding gas through regulator 56 to outlet 130 and controls the amount of shielding gas provided to a welding-type device connected thereto. A relief valve assembly 138 is also fluidly connected to gas passage 135 of regulator 56 and allows for the controlled release of gas contained therein in the event that a pressure of gas in gas passage 135 exceeds a maximum operating pressure. Outlet 130 includes a rib portion 140 constructed to receive hose 61, shown in FIG. 2, thereabout. The gas hose connects regulator 56 to a welding-type device and fluidly communicates shielding gas to a torch.

Figure 5:
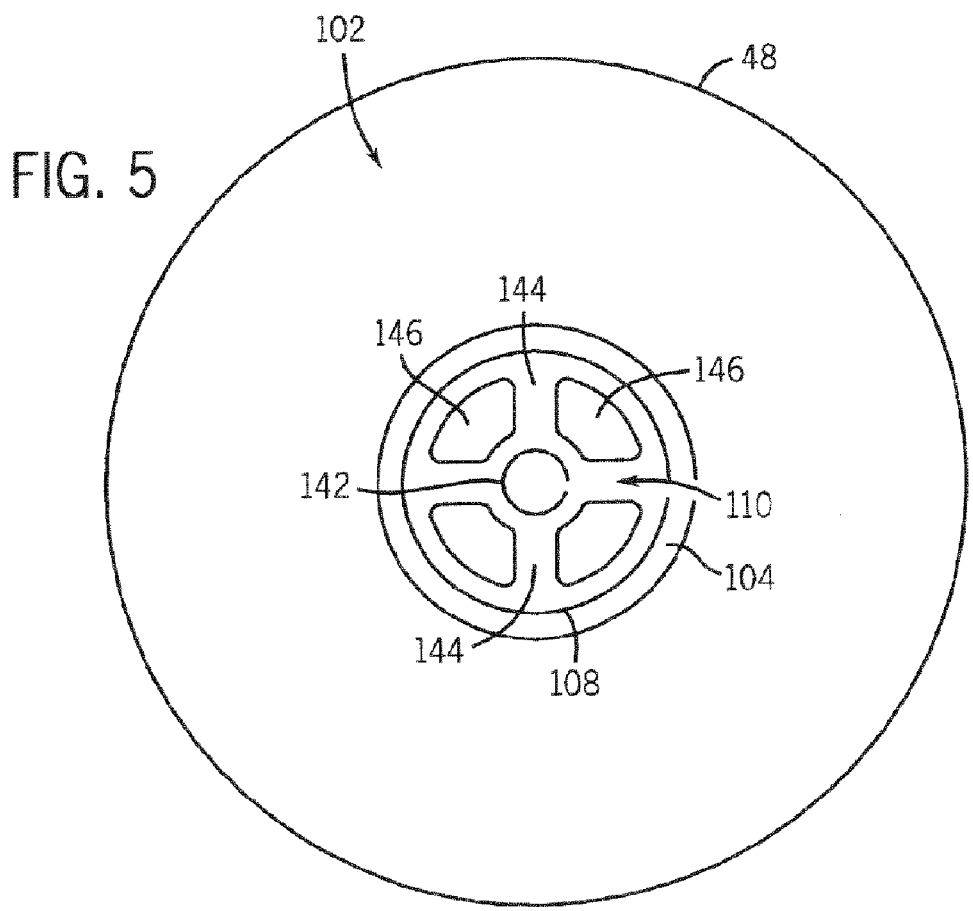
FIG. 5 is an end view of the gas cylinder taken along line 5-5 of FIG. 4.

FIG. 5 shows an end view of neck portion 102 of gas cylinder 48. Valve 110 is disposed in opening 108 of gas cylinder 48 and includes an actuator 142 generally centrally positioned therein. A plurality of ribs 144 are separated by a plurality of passages 146 and support actuator 142 in valve 110. Although biased closed, applying pressure to actuator 142 opens valve 110 and allows passage of shielding gas from within gas cylinder 48 through passages 146 and out of the gas cylinder. Threaded section 104 extends about valve 110 and has an axis of engagement generally coaxial with the axis of operation of actuator 142.

Figure 7:
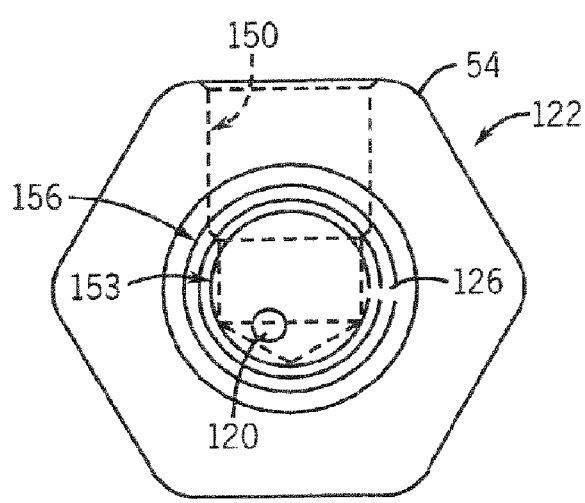
FIG. 7 is an end view of the adapter taken along line 7-7 of FIG. 4.
Figure 6:
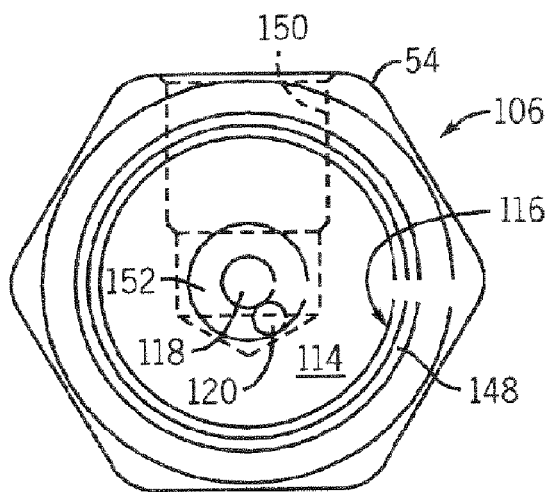
FIG. 6 is an end view of the adapter taken along line 6-6 of FIG. 4.

FIG. 6 shows an end view of first end 106 of adapter 54. A plurality of threads 148 extends about periphery 116 of recess 114. Nipple 118 extends into recess 114 and is generally concentric with threads 148. Passage 120 is offset from nipple 118 and passes through adapter 54 to second end 122 of adapter 54 as shown in FIG. 7. Returning to FIG. 6, a threaded opening 150 extends into adapter 54 and is in fluid communication with passage 120. Threaded opening 150 is constructed to receive a pressure gauge therein. Such a construction allows pressure gauge 124, shown in FIG. 4, to indicate the shielding gas pressure within passage 120. An annular groove 152 is formed about nipple 118 and provides for unobstructed passage of shielding gas from gas cylinder 48 to passage 120 upon connection of the gas cylinder to adapter 54. Upon connecting gas cylinder 48 to adapter 54, nipple 118 engages actuator 142 of valve 110 and immediately, automatically opens valve 110.

Referring to FIG. 7, a recess 153 is formed in second end 122 of adapter 54. Threaded portion 126 extends about a perimeter 156 of second end 122 and is constructed to threadingly engage regulator 56. Passage 120 fluidly communicates shielding gas to recess 154 which fluidly communicates shielding gas to regulator 56.

Figure 8:
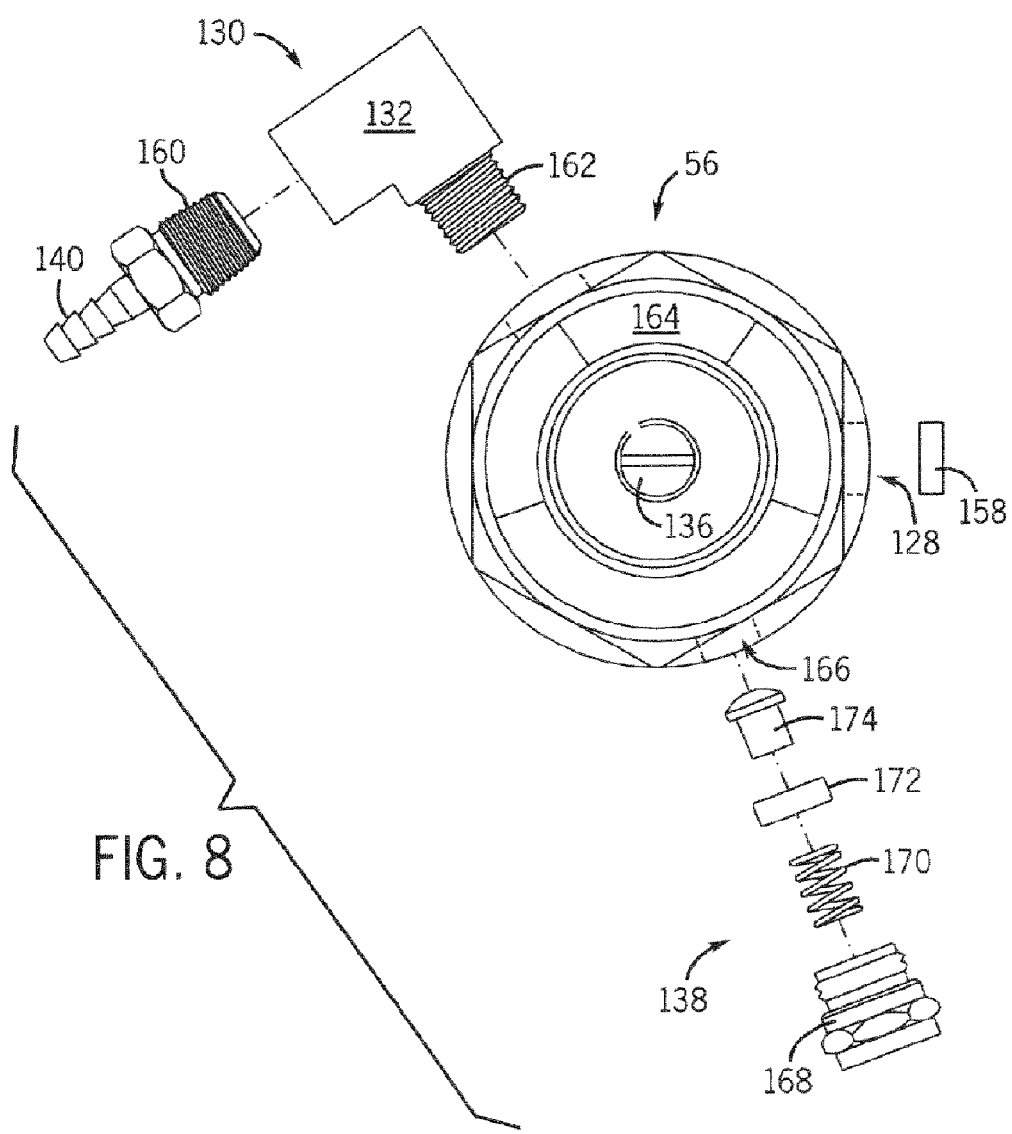
FIG. 8 is an exploded plan view of the regulator of the shielding gas system of FIG. 4.

Regulator 56 is shown in greater detail in FIG. 8. Opening 128 is constructed to receive a filter element 158 therein. Filter element 158 prevents the penetration of particulates that may be carried on the shielding gas flow through adapter 54 from passing into regulator 56. Outlet 130 has a threaded portion 160 opposite ribbed portion 140 constructed to threadingly engage elbow portion 132 of outlet 130. Elbow portion 132 includes a threaded portion 162 constructed to threadingly engage regulator 56. Adjusting screw 136 is rotatably connected to a body 164 of regulator 56 and allows operator control over an amount of shielding gas allowed to flow through regulator 56. A relief valve opening 166 is formed in regulator 56 and is constructed to receive a relief valve assembly 138 therein. A spring 170 biases a seat retainer 172 against a seat 174. A relief valve body 168 secures spring 170, seat retainer 172, and seat 174 within relief valve opening 166 of regulator 56. Relief valve assembly 138 allows for the pressure relief of shielding gas contained in regulator 56.

As shown in FIG. 9, an inner periphery 176 of opening 128 of regulator 56 threadingly engages threaded portion 126 of adapter 54 and fluidly communicates shielding gas to flow passage 135 of regulator 56 from passage 120 of adapter 54. Pressure gauge 124 is also fluidly connected to passage 120 of adapter 54 and indicates the gas pressure therein. Threading 148 of periphery 116 of recess 114 of first end 106 of adapter 54 is threadingly connected to threaded section 104 of gas cylinder 48. When fully connected, end face 112 of neck portion 102 of gas cylinder 48 extends past an end 178 of nipple 118. End 178 of nipple 118 engages actuator 142 of valve 110 of gas cylinder 48 and fluidly connects cavity 111 of gas cylinder 48 with passage 120 of adapter 54. As gas cylinder 48 is threaded into recess 114 of adapter 54, nipple 118 displaces actuator 142 of valve 110 in a direction generally opposite the direction of engagement, indicated by arrow 180, of threaded section 104 of gas cylinder 48 and recess 114 of adapter 54 thereby opening valve 110. A spring 182 biases valve 110 to a closed position when actuator 142 is not biased by nipple 118 of adapter 54. Upon connection of gas cylinder 48 to adapter 54, shielding gas contained within internal cavity 111 of gas cylinder 48 is allowed to flow through passage 120 of adapter 54 and into regulator 56. Such a connection automatically opens valve 110 of gas cylinder 48 upon connection of the gas cylinder to adapter 54 without requiring the manipulation of an additional valve.

Figure 10:
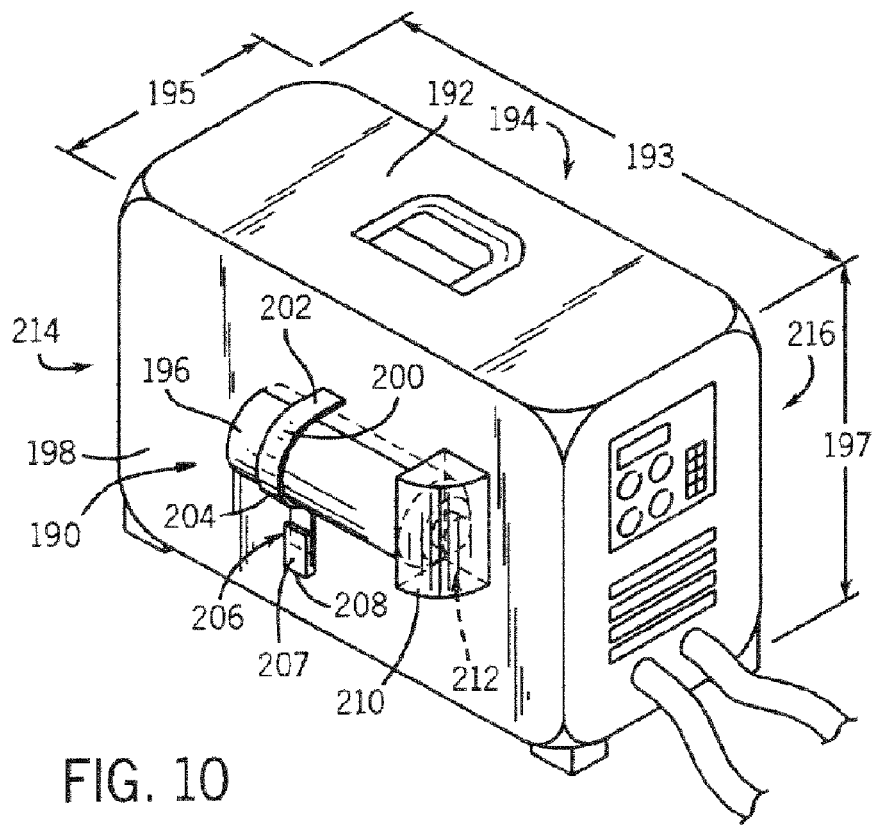
FIG. 10 is a perspective view of a welding-type device having a pressure vessel attached thereto in accordance with another embodiment of the present invention.

FIG. 10 shows another embodiment of the present invention. As shown in FIG. 10, a gas system 190 is supported at least partially external to a housing 192 of a welding-type device or welding device 194. Gas system 190 includes a pressure vessel 196 constructed to contain a shielding gas, such as weld-grade $CO_2$, is attached to a side panel 198 of welding-type device 194. Although shown as having a generally cylindrical shape, it is understood that pressure vessel 196 could be any shape. Additionally, housing 192 has a length 193, a width 195, and a height 197 such that pressure vessel 196 is arranged to not extend past at least one of length 193, width 195, or height 197.

A strap 200 secures pressure vessel 196 to side panel 198 when the pressure vessel is attached to welding-type device 194. Strap 200 has a first end 202 pivotally attached to side panel 198 of welding device 194 and a second end 204 with a latch 206 positioned thereat. A body 207 of latch 206 removeably engages a tab 208 extending from side panel 198 of welding device 194. A shroud 210 extends from side panel 198 and has a regulator 212 positioned at least partially therebehind. Regulator 212 engages pressure vessel 196 and is constructed to control the flow of gas from pressure vessel 196 to welding device 194. Shroud 210 protects regulator 212 from external debris and inadvertent contact during transport.

Pressure vessel 196 is shown supported by welding device 194 in a generally horizontal position relative thereto. It is understood that pressure vessel 196 could be supported in any relative position with respect to welding device 194 and the horizontal orientation shown is merely exemplary. Additionally, pressure vessel 196 is shown mounted to side panel 198 of welding-type device 194. It is understood that side panel 198 could also form a rear end panel 214 or a front end panel 216 of welding-type device 194. Understandably, pressure vessel 196 could be supported by any of the side panels of the welding-type device and in any position relative thereto. Preferably, to provide an operator with simple and efficient access to pressure vessel 196, pressure vessel 196 is supported by welding-type device 194 on front end panel 216 or any of the side panels of the housing generally transverse thereto. Additionally, it is equally understood that welding device 194 be constructed to allow a portion of pressure vessel 196 to pass through a panel of housing 192 of welding device 194 while another portion of pressure vessel 196 remains external thereto. Such a construction allows the pressure vessel to be quickly and efficiently connected/disconnected from the welding device while protecting the engageable components of the pressure vessel/welding device interface.

Figure 11:
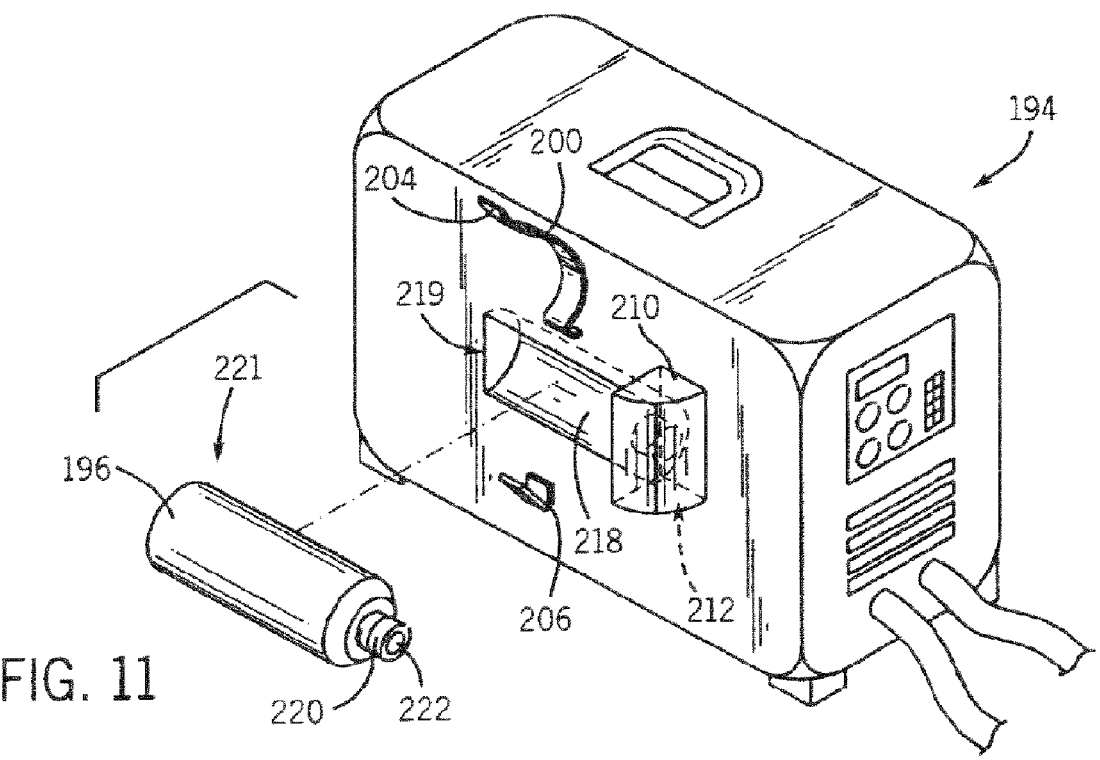
FIG. 11 is a perspective view of the welding-type device of FIG. 10 with the pressure vessel removed therefrom.

FIG. 11 shows pressure vessel 196 removed from welding device 194. Side panel 198 of housing 192 of welding device 194 has a recess 218 formed therein. Recess 218 is constructed to receive at least a portion of pressure vessel 196 therein. Recess 218 also has an end portion 219 that is constructed to have a base end 221 of pressure vessel 196 positioned proximate thereto. It is understood that housing 192 could be constructed with a boss or extension proximate end portion 219 of recess 218 such that the housing extends beyond base end 221 of pressure vessel 196. Pressure vessel 196 also has a neck portion 220 with a valve 222 positioned therein. Valve 222 of pressure vessel 196 is operated by an actuator similar to the nipple 118 of adapter 54 shown in FIG. 9. As shown in FIG. 11, latch 206 removeably engages second end 204 of strap 200 and allows pressure vessel 196 to be removed from welding device 194 when desired. Shroud 210 extends from side panel 198 about regulator 212 positioned therebehind such that shroud 210 protects regulator 212 from dirt, debris, and inadvertent contact therewith regardless of whether a pressure vessel is engaged with the regulator.

Figure 12:
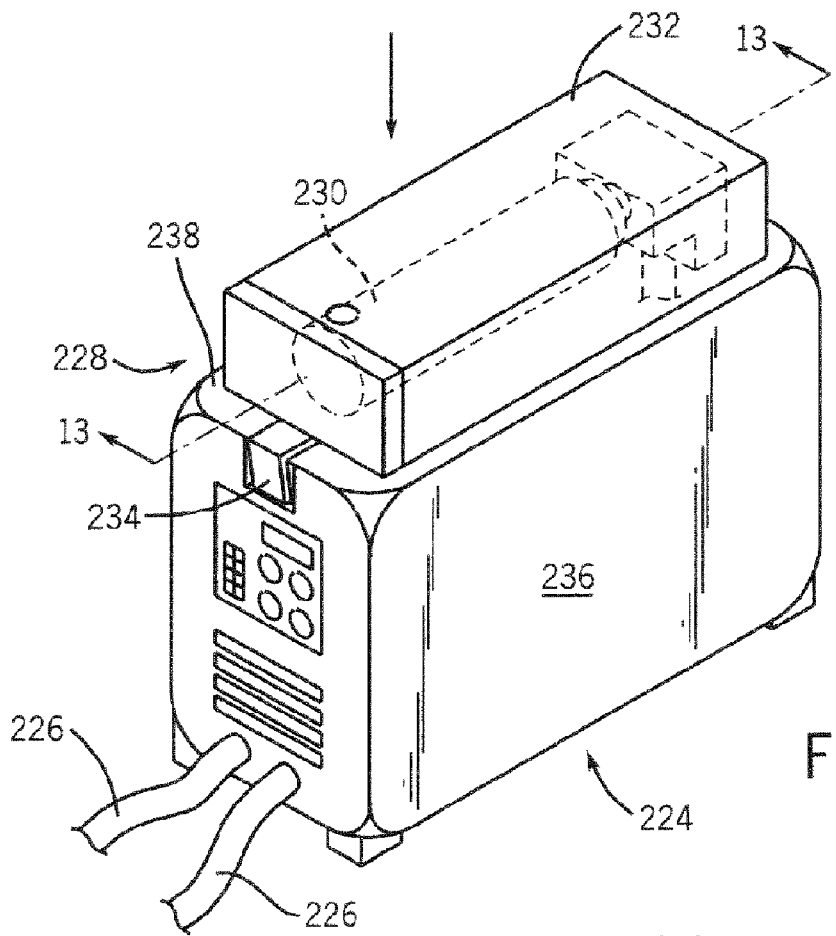
FIG. 12 is a perspective view of an apparatus constructed to generate a power signal suitable for welding-type applications with a gas source removed therefrom in accordance with a further embodiment of the present invention.

FIG. 12 shows a further embodiment of the present invention. As shown in FIG. 12, a welding apparatus 224 has a pair of weld cables 226 connectable thereto. A gas system 228 is removeably or pivotally connectable to welding apparatus 224. Gas system 228 has a pressure vessel 230 positioned in an enclosure 232 that is connectable to welding apparatus 224. Enclosure 232 is constructed to protect pressure vessel 230 from dirt and debris and allow quick efficient fluid connection of pressure vessel 230 to welding apparatus 224. Understandably, enclosure 232 could be constructed from an expanded material, such as a mesh, grating, or screening. Such a construction allows air flow through the enclosure and visual inspection of a pressure vessel positioned therein. A clasp 234 is attached to a housing 236 of welding apparatus 224 and removeably engages enclosure 232 of gas system 228 such that clasp 234 secures gas system 228 to welding apparatus 224 when gas system 228 is engaged therewith. Clasp 234 is operable to allow an operator to quickly, efficiently, and repeatably remove or connect gas system 228 with welding apparatus 224. Alternatively, a restraint, strap, or latch could be provided to secure gas system 228 to welding apparatus 224, gas system 228 could be pivotally connected to welding apparatus 224 via a hinge or the like, or enclosure 232 could include an operable door such that a pressure vessel contained therein can be removable from welding apparatus 224 while enclosure 232 remains attached to the welding apparatus. Although gas system 228 is shown attached to a top surface 238 of welding apparatus 224, it is further understood that gas system 228 can be attached to any side of welding apparatus 224 having a gas passage therethrough. Preferably though, gas system 228 doe not extend beyond the ends of any side it is mounted to, although doing so is within the scope of the appending claims.

Figure 13:
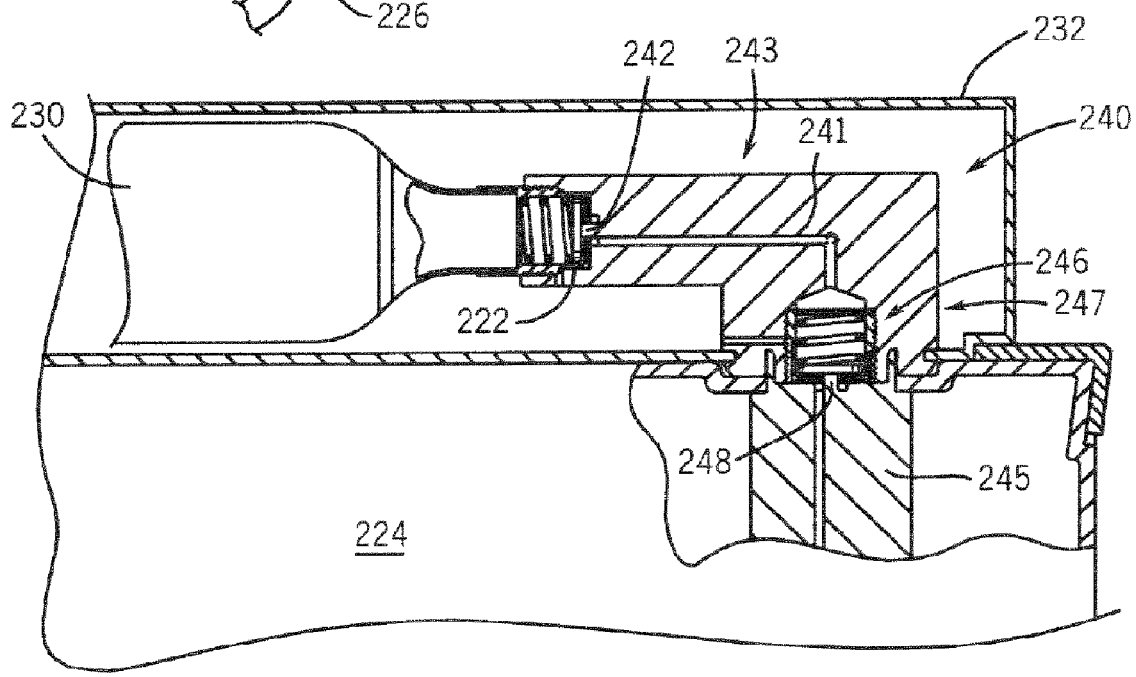
FIG. 13 is an elevational view of a portion of the apparatus of FIG. 12 taken along line 13-13 of FIG. 11 with the gas source engaged therewith.

FIG. 13 shows an elbow connector 240 having a gas passage 241 fluidly connecting the gas contained in pressure vessel 230 with welding apparatus 224. Elbow connector 240 is connected to valve 222 on one end 243 and to a regulator 245 on another end 247. Enclosure 232 has an actuator 242 positioned therein and constructed to operatively engage valve 222 of pressure vessel 230. Enclosure 232 also has a valve 246 positioned therein. Valve 246 of enclosure 232 prevents passage of gas from pressure vessel 230 beyond enclosure 232 until enclosure 232 is connected to welding apparatus 224. Regulator 245 of welding apparatus 224 has an actuator 248 extending therefrom. Actuator 248 of regulator 245 opens valve 246 of enclosure 232 when the enclosure is connected to welding apparatus 224 and allows the passage of gas from pressure vessel 230 located in enclosure 232 into welding apparatus 224 upon the connection of the enclosure thereto. Such a construction forms a removable, replaceable gas system that is quickly and conveniently connectable to a welding apparatus. It is also understood and with the scope of the claims that elbow connector 240 could be replaced by regulator 245 such that regulator 245 is accessible through enclosure 232 and fluidly connectable to welding apparatus 224.

Therefore, the present invention includes a gas system for a welding-type device having a pressure vessel constructed to provide a shielding gas to the welding-type device. The pressure vessel is removeably supported by the welding-type device such that the welding-type device is efficiently and conveniently transportable by a single person and has a source of shielding gas securely connected thereto.

One embodiment of the present invention includes a welding-type device having a pressure vessel constructed to provide a shielding gas to a weld and sized for direct mounting to a housing positioned about a power supply constructed to generate a welding-type power. The pressure vessel is supported by the housing and is attached at least partially to an exterior thereof. Such a construction forms a welding-type device having a shielding gas source that is quickly and efficiently replenishable.

Another embodiment of the present invention includes a gas system for a welding-type apparatus. The gas system includes a canister constructed to receive a gas therein. An enclosure is constructed to receive at least a portion of the canister therein. The gas system includes a retainer to removeably secure the enclosure to a housing of a welding-type apparatus when the enclosure is attached thereto.

A further embodiment of the present invention includes an apparatus having a power source configured to generate a power signal suitable for welding-type applications. A housing is positioned about at least a portion of the power source. A regulator is supported by at least one of the housing and the power source and is connectable to a gas container that is at least partially external to the housing.

The present invention has been described in terms of the preferred embodiment, and it is recognized that equivalents, alternatives, and modifications, aside from those expressly stated, are possible and within the scope of the appending claims.

What is claimed is:

1. A welding-type device comprising:
   a power supply constructed to generate a welding-type power;
   a housing positioned about the power supply;
   a pressure vessel attached at least partially to an exterior of the housing and supported thereby, the pressure vessel constructed to provide a shielding gas to a weld and sized for direct mounting to the housing; and
   an enclosure constructed to receive the pressure vessel, the enclosure being removeably attachable to the housing of the welding-type device and further comprising at least one latch constructed to engage the enclosure and secure the enclosure to the housing of the welding-type device when engaged therewith.

2. The welding-type device of claim 1 wherein the housing has a length, a width, and a depth, and wherein the pressure vessel has dimensions and is arranged to not extend past at least one of the length, width, and depth of the housing.

3. The welding-type device of claim 1 wherein the housing further comprises a plurality of sides, at least one of the sides having a recess formed therein, the recess constructed to receive at least a portion of the pressure vessel therein.

4. The welding-type device of claim 3 wherein the recess has a shape that substantially matches a shape of the portion of the pressure vessel received therein.

5. The welding-type device of claim 3 further comprising a retainer connected to the housing and constructed to removeably secure the pressure vessel thereto and wherein the pressure vessel is a gas cylinder.

6. The welding-type device of claim 1 further comprising a regulator attached to the housing and constructed to engage the pressure vessel, the regulator fluidly connecting the pressure vessel and the welding-type device, and further comprising a shroud attached to the housing and positioned about the regulator.

7. A gas system comprising:
   a housing of a welding-type apparatus;
   a canister constructed to contain a gas therein;
   an enclosure constructed to receive at least a portion of the canister therein; and
   a retainer to removably secure the enclosure to a housing of a welding-type apparatus wherein the canister is fluidly connected to the welding-type apparatus when the enclosure is attached thereto.

8. The gas system of claim 7 further comprising a regulator attached to and at least partially contained in at least one of the canister and the welding-type apparatus, the regulator constructed to control a flow of gas from the canister to the welding-type apparatus.

9. The gas system of claim 7 wherein the retainer includes a latch attached to at least one of the enclosure and the welding-type apparatus, and a loop removeably engageable with at least one of the enclosure and the welding-type apparatus to secure the canister to the enclosure.

10. The gas system of claim 7 wherein the housing of the welding-type apparatus includes a recess formed therein, the recess constructed to receive at least a portion of the enclosure therein.

11. The gas system of claim 7 wherein the enclosure further comprises a nipple constructed to operatively engage a valve of the canister when the canister is connected thereto.

12. The gas system of claim 7 further comprising a gas passage formed through the enclosure and constructed to communicate the gas contained in the canister to the welding-type apparatus when the enclosure is attached thereto, and wherein the enclosure further comprises a valve in fluid communication with the gas passage, the valve constructed to prevent passage of the gas beyond the enclosure when the enclosure is disconnected from the welding-type apparatus.

13. The gas system of claim 7 wherein the housing of the welding-type apparatus is further defined as a plurality of side panels and the enclosure is removeably attachable to a side panel of the housing of the welding-type apparatus without repositioning any of the plurality of side panels.

14. An apparatus comprising:
   a power source configured to generate a power signal suitable for welding-type applications;
   a housing positioned about at least a portion of the power source; and
   a regulator supported by at least one of the housing and the power source and connectable to a gas container that is at least partially external to the housing when connected to the regulator, the gas container having a length that is generally less than at least one of a length and a height of the housing.

15. The apparatus of claim 14 wherein the housing further comprises a flange extending from the housing, the flange constructed to enclose at least a portion of the regulator.

16. The apparatus of claim 14 wherein the housing further comprises a recess formed therein and constructed to receive a portion of the gas container therein and further comprises retention means adjacent the recess and constructed to secure the gas container to the housing when the gas container is positioned in the recess.

17. The apparatus of claim 14 further comprising an enclosure removeably connectable to the housing and constructed to receive the gas container therein, the enclosure comprising a gas passage formed therethrough, the gas passage constructed to allow passage of gas from the gas container when connected to the housing.

18. The apparatus of claim 14 wherein the gas container further comprises a valve connected thereto, the valve operable to automatically allow passage of gas from the gas container upon the gas container being fluidly connected to the regulator.

* * * * *